(12) United States Patent
Sakata et al.

(10) Patent No.: US 7,817,848 B2
(45) Date of Patent: Oct. 19, 2010

(54) APPARATUS, METHOD, AND COMPUTER PRODUCT FOR DISCRIMINATING OBJECT

(75) Inventors: Katsumi Sakata, Hyogo (JP); Junichi Sawada, Hyogo (JP)

(73) Assignee: Fujitsu Ten Limited, Kobe-shi (JP)

( * ) Notice: Subject to any disclaimer, the term of this patent is extended or adjusted under 35 U.S.C. 154(b) by 1007 days.

(21) Appl. No.: 11/600,191

(22) Filed: Nov. 16, 2006

(65) Prior Publication Data

US 2007/0206849 A1 Sep. 6, 2007

(30) Foreign Application Priority Data

Nov. 28, 2005 (JP) .............................. 2005-342950

(51) Int. Cl.
    *G06K 9/00* (2006.01)
(52) U.S. Cl. .................. 382/159; 382/195; 382/104
(58) Field of Classification Search ............... 382/159, 382/104, 157, 195; 701/1; 706/15, 20
    See application file for complete search history.

(56) References Cited

U.S. PATENT DOCUMENTS

| | | | |
|---|---|---|---|
| 5,461,357 A * | 10/1995 | Yoshioka et al. | 340/435 |
| 5,945,926 A * | 8/1999 | Ammar et al. | 340/970 |
| 6,163,755 A * | 12/2000 | Peer et al. | 701/301 |
| 6,765,480 B2 * | 7/2004 | Tseng | 340/425.5 |
| 6,813,370 B1 * | 11/2004 | Arai | 382/104 |
| 6,993,159 B1 * | 1/2006 | Ishii et al. | 382/104 |
| 7,612,800 B2 * | 11/2009 | Okada et al. | 348/169 |
| 2004/0096082 A1 * | 5/2004 | Nakai et al. | 382/104 |
| 2005/0004739 A1 * | 1/2005 | Hiwatashi | 701/70 |
| 2005/0029458 A1 * | 2/2005 | Geng et al. | 250/347 |
| 2005/0031171 A1 * | 2/2005 | Krukowski et al. | 382/114 |
| 2005/0225439 A1 * | 10/2005 | Watanabe et al. | 340/435 |

FOREIGN PATENT DOCUMENTS

| | | |
|---|---|---|
| JP | A-07-065294 | 3/1995 |
| JP | A-07-302328 | 11/1995 |
| JP | A-07-333339 | 12/1995 |
| JP | A 2001-236508 | 8/2001 |
| JP | A 2003-502745 | 1/2003 |
| JP | A-2003-187248 | 7/2003 |
| JP | A-2004-145660 | 5/2004 |
| JP | A-2004-220555 | 8/2004 |
| JP | A-2005-311691 | 11/2005 |
| WO | WO 00/77736 | 12/2000 |

OTHER PUBLICATIONS

Oct. 22, 2009 Office Action for Japanese Patent Application No. 2005-342950 (with translation).

* cited by examiner

*Primary Examiner*—Daniel G Mariam
*Assistant Examiner*—Aklilu K Woldemariam
(74) *Attorney, Agent, or Firm*—Oliff & Berridge, PLC

(57) ABSTRACT

An apparatus discriminates a potential obstacle in the path of a vehicle from among various objects in an image shot by a monocular camera. First, an object detecting unit detects an object in the image by applying a saliency calculation to the image. Second, an object discriminating unit discriminates an object from among the objects detected by the object detecting unit as a potential obstacle by applying a neural network method to the objects.

15 Claims, 5 Drawing Sheets

FIG.3

| POTENTIAL OBJECT | DISTANCE | RISK LEVEL |
|---|---|---|
| IT IS NOT PEDESTRIAN | ALL | 0 |
| IT IS PEDESTRIAN | 30 m OR MORE | LEVEL 1 |
| | 10 TO 30 m | LEVEL 2 |
| | LESS THAN 10 m | LEVEL 3 |

APPARATUS, METHOD, AND COMPUTER PRODUCT FOR DISCRIMINATING OBJECT

BACKGROUND OF THE INVENTION

1. Field of the Invention

The present invention generally relates to a technology for discriminating a specific object in an image, and specifically relates to discriminating a specific object based on an image shot by a monocular camera.

2. Description of the Related Art

Technologies have been known that aim at avoiding a collision of a vehicle with an obstacle (for example, a pedestrian) in a driving path of the vehicle. Such technologies include capturing an image (for example, a photograph) of a region in front of the vehicle, and detecting and discriminating the obstacle from among various other objects in the image.

Japanese Patent Application Laid-open No. 2003-502745 discloses a technology that acquires a pair of stereo images of an area in front of the vehicle, detects objects in the stereo images, and discriminates a potential obstacle from among the detected objects by applying an object discriminating method using a neural network. The neural network is caused to learn various forms (or shapes) of pedestrians, whereby it becomes possible to accurately recognize a pedestrian in an image even if the pedestrian has a slightly different form.

Each of the stereo images is acquired with a separate camera attached to the vehicle. Thus, the technology disclosed in Japanese Patent Application Laid-open No. 2003-502745 requires two cameras, which makes the structure complicated and increases the manufacturing cost of the system.

On the other hand, to solve such drawbacks, a background difference method, which detects an object (for example, a pedestrian) based on a difference between a pixel value (such as brightness) of a current image and a pixel value of a previous image using a monocular camera, can be considered. However, if the object is stationary, the pixel value of the current image and the pixel value of the previous image are same, which makes detection of the object difficult.

Another approach could be to apply the neural network to an image shot by a monocular camera, i.e. an image shot by a single camera. However, if the neural network is applied over the whole area of the image it takes a lot of time to discriminate an object from the image thereby resulting in inefficient processing.

SUMMARY OF THE INVENTION

It is an object of the present invention to at least partially solve the problems in the conventional technology.

According to an aspect of the present invention, an apparatus for discriminating an imaged object within an image based on the image shot by a monocular camera, includes an object detecting unit that detects an object in the image by applying a saliency calculation to the image; and an object discriminating unit that applies a neural network method to the object detected by the object detecting unit to discriminate whether the object is a potential obstacle.

According to another aspect of the present invention, an apparatus for discriminating an imaged object within an image based on shot image, includes a learning base storing unit that creates and stores therein a learning base for a plurality of backgrounds; a discriminating-pattern storing unit that learns and stores therein specific patterns of an object in advance; an object detecting unit that compares the learning base and an actual input background image, and detects a residual as a potential object; and an object discriminating unit that compares the potential object with the specific patterns present in the discriminating-pattern storing unit, and discriminates whether the potential object is a specific object.

According to still another aspect of the present invention, a warning apparatus operating with an object discriminating device for discriminating an imaged object within an image based on shot image, the object discriminating device including a learning base storing unit that creates and stores therein a learning base for a plurality of backgrounds; a discriminating-pattern storing unit that learns and stores therein specific patterns of an object in advance; an object detecting unit that compares the learning base and an actual input background image, and detects a residual as a potential object; and an object discriminating unit that compares the potential object with the specific patterns present in the discriminating-pattern storing unit, and discriminates whether the potential object is a specific object. The warning apparatus includes a warning unit that outputs a warning in accordance with a discrimination result obtained by the object discriminating device.

According to still another aspect of the present invention, a vehicle-controlling apparatus installed on a vehicle and operating with an object discriminating device for discriminating an imaged object within an image based on shot image, the object discriminating device including a learning base storing unit that creates and stores therein a learning base for a plurality of backgrounds; a discriminating-pattern storing unit that learns and stores therein specific patterns of an object in advance; an object detecting unit that compares the learning base and an actual input background image, and detects a residual as a potential object; and an object discriminating unit that compares the potential object with the specific patterns present in the discriminating-pattern storing unit, and discriminates whether the potential object is a specific object. The vehicle-controlling apparatus includes a controlling unit that controls driving of the vehicle in accordance with a discrimination result obtained by the object discriminating device.

According to still another aspect of the present invention, a method of discriminating an imaged object within an image based on the image shot by a monocular camera, includes detecting an object in the image by applying a saliency calculation to the image; and applying a neural network method to detected object to discriminate whether the object is a potential obstacle.

According to still another aspect of the present invention, a method of discriminating an imaged object within an image based on shot image, includes creating and storing a learning base for a plurality of backgrounds; learning and storing specific patterns of an object in advance; comparing the learning base and an actual input background image; detecting a residual as a potential object; and discriminating whether the potential object is a specific object by comparing the potential object with the specific patterns stored in advance at the storing.

According to still another aspect of the present invention, a computer-readable recording medium stores therein a computer program that causes a computer to execute the above method of discriminating an object within an image.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is an example of the contents of a collision-risk determination table shown in FIG. 2;

DETAILED DESCRIPTION OF THE PREFERRED EMBODIMENTS

Exemplary embodiments of the present invention will be explained below in detail with reference to accompanying drawings. Object discriminating apparatuses according to the following embodiments are installed on a vehicle. In the following explanation, warning operation means producing a warning for a driver of the vehicle, and driving operation means driving the vehicle.

Figure 1:
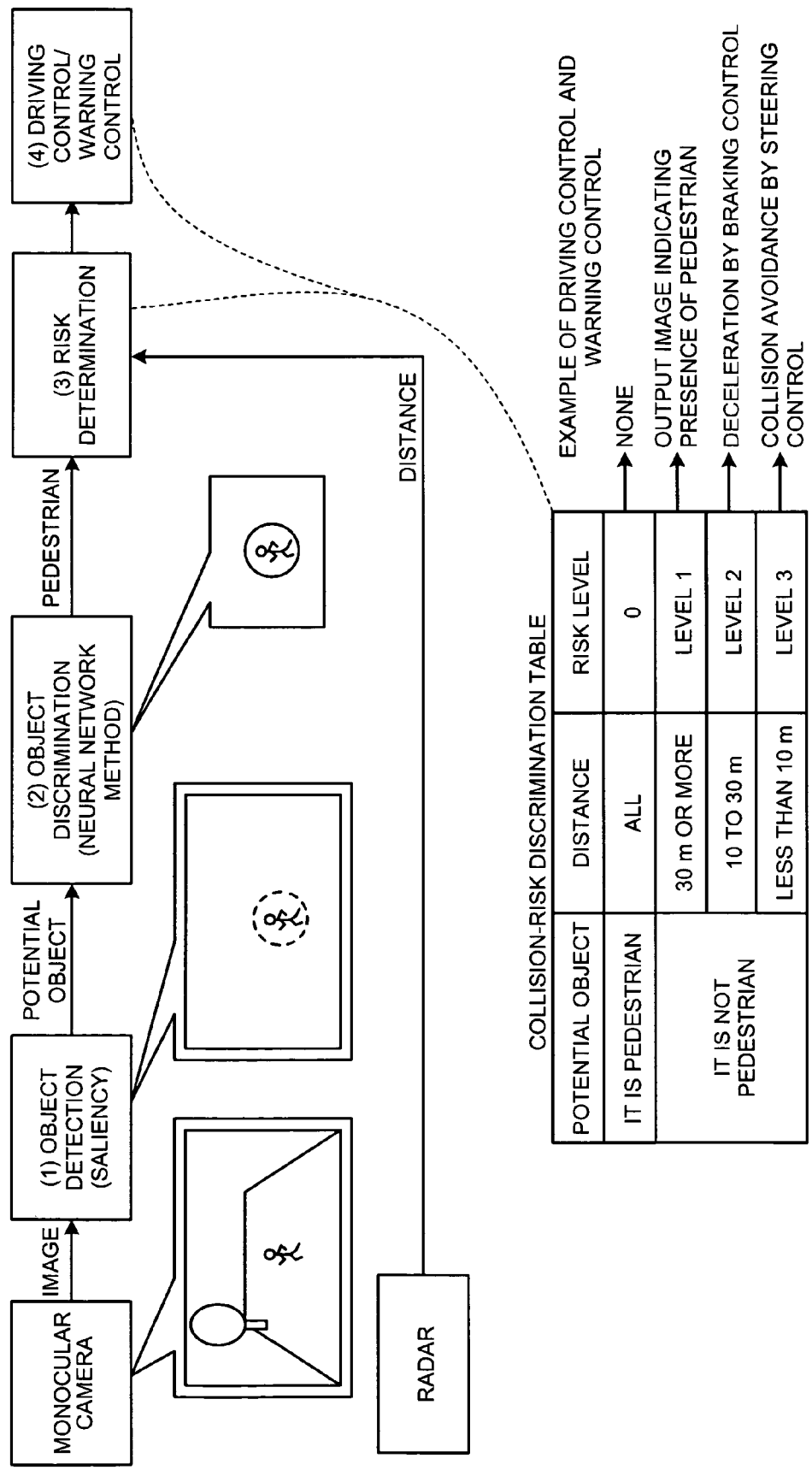
FIG. 1 is a schematic for explaining an outline and features of an object discriminating apparatus according to a first embodiment of the present invention.

FIG. 1 is a schematic for explaining an outline and features of an object discriminating apparatus according to the first embodiment of the present invention.

The object discriminating apparatus principally discriminates whether there is an object (for example, a pedestrian) within an image shot by a monocular camera, and controls warning and driving operations based on the result of the discrimination. In other words, the object discriminating apparatus can efficiently discriminate an object in an image shot by a monocular camera.

Specifically, the object discriminating apparatus detects an object to be discriminated (for example, a pedestrian) by performing a saliency calculation on an image shot by a monocular camera (see block (1) in FIG. 1). Object detection by the saliency calculation is carried out depending on whether any salient feature is detected on an input image based on a learning base created and stored through a learning process in advance.

At the learning process, a plurality of images for learning on which the same objects (background, for example, a road) are imaged without any particular object (for example, a pedestrian) is input and at least one learning area (for example, 20×20 pixels) is cut out from each of the images for learning. Then, the cut out learning area is handled as an N-dimensional vector (where N is a pixel value, for example, 20×20 pixels are 400 dimension), and a principal component of the learning area including the N-dimensional vector is analyzed to extract a feature vector (principal component of the N-dimensional vectors). Feature vectors are then extracted from the entire input learning images, to create and store a learning base from feature vector components common to the same object.

At the object detection, a processing area in the same size as the learning area (for example, 20×20 pixels) is cut out from an input image input from an imaging device (for example, a monocular camera). The cut out processing area is then handled as an N-dimensional vector, and developed on the learning base (i.e. an inner product of the N-dimensional vector and a feature vector is calculated). A residual between the vector obtained from this development and the vector in the processing area is calculated as a salient feature (saliency). Moreover, parts in the image with larger saliencies are detected as areas where there is a high probability of presence of potential objects.

When a potential object is detected, to decide whether the potential object is a pedestrian, the object discriminating apparatus discriminates the potential object by applying a neural network method to the potential object (see block (2) in FIG. 1). Object discrimination by the neural network method is an information processing mechanism that is created by imitating the structure of a human brain. A neural network is configured by adapting a complex structure of integrated nerve cells spread inside a human brain called as neuron, so that the information processing mechanism incorporates and performs object discrimination, for which human beings have an excellent ability. Specifically, patterns of objects learned and stored in advance are compared with a detected area of a potential object suspected to be a driving obstacle detected from the image, for example, by the saliency calculation. Due to this comparison, the potential object is discriminated if it is a particular object.

Thus, the object discriminating apparatus according to the first embodiment can detect an object to be discriminated from an image shot by a monocular camera. Moreover, the object discriminating apparatus can detect an object that is stationary. Furthermore, the object discriminating apparatus can detect the object even if there is only little change on the image because the object is situated far from the vehicle. Thus, because the object discriminating method based on the neural network is applied to the detected object, the object can be more efficiently discriminated on the image shot by the monocular camera. A pattern matching method, by which a detected object is compared with regular patterns recorded in advance to discriminate the detected object, can discriminate only an object that corresponds to one of the regular patterns. However, the object discrimination based on the neural network can discriminate a detected object having a fuzzy contour (for example, a pedestrian) that is not included in the regular patterns.

Furthermore, as shown in FIG. 1, using the distance between the vehicle and the object acquired by a radar (for example, a millimeter wave radar, or an optical radar) in addition to the discrimination result (for example, the detected object is a pedestrian, or not pedestrian) acquired by the object discrimination, the object discriminating apparatus determines a risk of collision of the vehicle with the object, and controls driving and warning operations depending on the determination result (see blocks (3) and (4) in FIG. 1).

In other words, for example, when the object discrimination leads to a discrimination result that the detected object is not pedestrian, the object discriminating apparatus determines that there is no risk of collision (level zero), and does not perform driving or warning operation. On the contrary, when the object discrimination leads to a discrimination result that the detected object is a pedestrian, the object discriminating apparatus recognizes feet of the pedestrian (ground contact point) on the image, and acquires a distance between the ground contact point and the vehicle by the radar. When the distance between the pedestrian and the vehicle is long (for example, 30 meters or more), the object discriminating apparatus determines that the risk of collision is low (level 1), and outputs an image indicating the pedestrian onto a monitor (for example, a monitor of a car navigation system). When the distance is intermediate (for example, between 10 meters and 30 meters), the object discriminating apparatus determines that the risk of collision is medium (level 2), and performs a braking operation to decelerate the vehicle. Further when the distance is very short (for example, less than 10 meters), the object discriminating apparatus determines that the risk of collision is high (level 3), and performs a steering operation to avoid collision of the vehicle with the pedestrian. Thus, the object discriminating apparatus controls warning and driving operations in accordance with the distance between the vehicle and the pedestrian. Thus, the object discriminating apparatus can appropriately controls warning and driving operations in accordance with the distance between the vehicle and the object.

Figure 2:
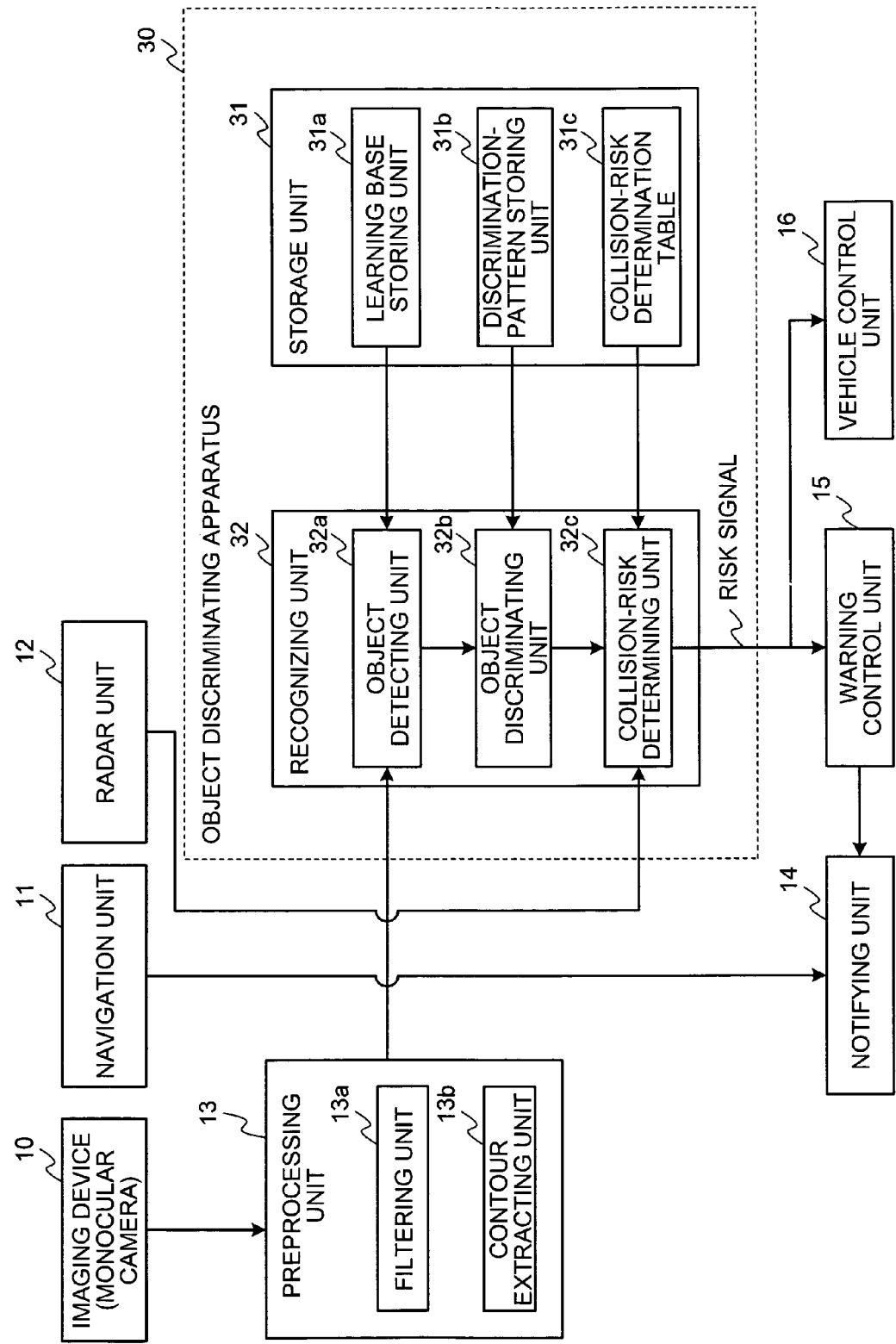
FIG. 2 is a detailed functional block diagram of the object discriminating apparatus shown in FIG. 1.

Next, a concrete example of a configuration of an object discriminating apparatus 30 according to the first embodiment is explained with reference to FIGS. 2 and 3. FIG. 2 is a detailed functional block diagram of the object discriminating apparatus 30, and FIG. 3 is an example of contents of a collision-risk determination table 31c shown in FIG. 2.

As shown in FIG. 2, the object discriminating apparatus 30 is connected to a radar unit 12, a preprocessing unit 13, a warning control unit 15, and a vehicle control unit 16, and in addition around these units, arranged with an imaging device (monocular camera) 10, a navigation unit 11, and a notifying unit 14. The object discriminating apparatus 30 includes a storage unit 31 and a recognizing unit 32.

The navigation unit 11 sets and guides a driving route based on a specified location of the vehicle and map data by communicating with a global positioning system (GPS) satellite. Moreover, the navigation unit 11 provides various information useful for driving operation, such as a location of the vehicle, road formation, a road width, inclination and the like, to a driver of the vehicle via the notifying unit 14.

The radar unit 12 irradiates radar waves for, for example, a millimeter radar wave of 76.5 GHz or an optical radar, to measure a distance, a speed, a direction or the like, with respect to another vehicle or an obstacle in front. Specifically in the first embodiment, when receiving an instruction to measure a distance between a pedestrian and the vehicle from a collision-risk determining unit 32c, the radar unit 12 acquires the distance by radar, and then sends the distance to the collision-risk determining unit 32c.

The preprocessing unit 13 preprocesses an image received from the imaging device (monocular camera) 10, and includes a filtering unit 13a and a contour extracting unit 13b. The filtering unit 13a preprocesses the image to emphasize a contour of an object in the image (for example, adjusting sharpness, contrast, and chroma). The contour extracting unit 13b extracts the contour of the object on the image filtered by the filtering unit 13a.

The notifying unit 14 notifies information from the navigation unit 11 and the warning control unit 15, which will be described later, and includes a monitor and a speaker. For example, the notifying unit 14 receives an instruction from the warning control unit 15, then outputs an image indicating presence of a pedestrian onto the monitor to attract the driver's attention, or produces a voice message or an alarm from the speaker to warn the driver.

The warning control unit 15 receives a risk signal from the collision-risk determining unit 32c, which will be described later, and controls warning operation. Specifically, in the first embodiment, when receiving a risk signal to output an image indicating presence of a pedestrian (for example, a risk signal at risk level 1) from the collision-risk determining unit 32c, the warning control unit 15 transmits, for example, an instruction to output the image indicating presence of the pedestrian, or an instruction to output a warning by voice or sound, depending on a situation, to the notifying unit 14.

The vehicle control unit 16 receives the risk signal from the collision-risk determining unit 32c, and controls driving operation. Specifically, in the first embodiment, when receiving a risk signal to control braking (for example, a risk signal at risk level 2) from the collision-risk determining unit 32c, the vehicle control unit 16 outputs, for example, a deceleration instruction by braking control, depending on a driving condition. When receiving a risk signal to control steering (for example, a risk signal at risk level 3) from the collision-risk determining unit 32c, similarly depending on a driving situation, the vehicle control unit 16 outputs, for example, an instruction for collision avoidance by steering control, or an instruction for pre-crash safety by braking control.

The storage unit 31 in the object discriminating apparatus 30 stores data and a computer program required for processing performed by the recognizing unit 32. Closely relating to the embodiment in particular, the storage unit 31 includes a learning base storing unit 31a, a discrimination-pattern storing unit 31b, and the collision-risk determination table 31c.

The learning base storing unit 31a stores a learning base required for object detection by an object detecting unit 32a, which will be described later. Specifically, a plurality of images for learning on which the same objects (background) are imaged without any particular object (for example, a pedestrian) is input and at least one learning area (for example, 20×20 pixels) is cut out from each of the images for learning. A cut out learning area is then handled as an N-dimensional vector (where N is a pixel value, for example, 20×20 pixels are 400 dimension), and a principal component of the learning area including the N-dimensional vector is analyzed to extract a feature vector (principal component of the N-dimensional vectors). Feature vectors are then extracted from the entire input learning images, to create and store a learning base from feature vector components common to the same object.

The discrimination-pattern storing unit 31b stores therein discrimination patterns required for object discrimination by an object discriminating unit 32b, which will be described later. Specifically, for example, the discrimination-pattern storing unit 31b learns respective patterns of a pedestrian (for example, a pattern of a pedestrian created of combinations of the whole body, a head, legs, feet, shoulders, and the like) are stored as per several conditions (for example, a distance).

The collision-risk determination table 31c stores therein a determination table required for determination of a risk of collision by the collision-risk determining unit 32c, which is described later. Specifically, shown in FIG. 3, for example, when a potential object is not pedestrian, a risk level is at zero in all cases, regardless of a distance between the vehicle and the potential object. On the other hand, for example, when the potential object is a pedestrian, determination results are provided in accordance with the distance: when the distance is 30 meters or more, the risk is at level 1; when the distance is between 10 to 30 meters, the risk is at level 2; and when the distance is less than 10 meters, the risk is at level 3.

The recognizing unit 32 in the object discriminating apparatus 30 includes an internal memory for storing therein a control computer program, a computer program that defines a procedure of processing, and required data. The recognizing unit 32 executes various kinds of processing with these computer programs and data. Closely relating to the embodiment in particular, the recognizing unit 32 includes the object detecting unit 32a, the object discriminating unit 32b, and the collision-risk determining unit 32c.

The object detecting unit 32a detects an object to be discriminated (potential object) within an input image by using the saliency calculation. Specifically, the object detecting unit 32a reads out a learning base from the learning base storing unit 31a. When a salient feature (for example, an exceptional vector) that is not found in the learning base is discovered within the input image received from the imaging device 10 via the preprocessing unit 13, an area where the salient feature is discovered is assumed that a potential object is present, and the object detecting unit 32a then detects the area.

The object discriminating unit 32b discriminates a potential object detected by the object detecting unit 32a by using a neural network in detail. Specifically, the object discriminating unit 32b compares a pattern of an object (for example, a pattern of a pedestrian created of combinations of the whole body, a head, legs, feet, shoulders, and the like) learned in advance and the area where the potential object detected by the object detecting unit 32a as a discrimination target is present to discriminate the object if it is a particular object (for example, a pedestrian).

The collision-risk determining unit 32c determines a risk of collision of the vehicle with the object based on information including a discrimination result of the potential object by the object discriminating unit 32b, and outputs a risk signal to control warning or driving operation to the warning control unit 15 or the vehicle control unit 16. Specifically, when receiving the discrimination result of the potential object from the object discriminating unit 32b, the collision-risk determining unit 32c transmits an instruction for the radar unit 12 to measure a distance between the vehicle and the potential object, and reads out a collision-risk determination table (see FIG. 3) from the collision-risk determination table 31c. The collision-risk determining unit 32c determines a risk of collision based on the discrimination result received from the object discriminating unit 32b, the distance between the vehicle and the potential object acquired from the radar unit 12, and the collision-risk determination table 31c. When a level of risk is determined, the collision-risk determining unit 32c transmits a risk signal indicative of the level of risk to control driving operation to the vehicle control unit 16, and to control warning operation to the warning control unit 15.

In other words, for example, when obtaining a discrimination result that the potential object is not pedestrian from the object discriminating unit 32b, the collision-risk determining unit 32c determines that there is no risk of collision (level zero) (see FIG. 3), and does not output a risk signal to control warning or driving operation to the warning control unit 15 or the vehicle control unit 16. In contrast, when receiving a discrimination result that the potential object is a pedestrian from the object discriminating unit 32b, the collision-risk determining unit 32c transmits an instruction to measure a distance between a position of the pedestrian and the vehicle recognized on the image to the radar unit 12, and acquires the distance. If the distance between the pedestrian and the vehicle is long (for example, 30 meters or more), the collision-risk determining unit 32c determines that the risk of the collision is low (level 1). If the risk level is 1, the collision-risk determining unit 32c transmits a risk signal indicative of the risk level 1 to the warning control unit 15 whereby a monitor (for example, a monitor of a car navigation system) displays an image indicating presence of the pedestrian. If the distance is intermediate (for example, between 10 meters and 30 meters), the collision-risk determining unit 32c determines that the risk of collision is intermediate (level 2). If the risk level is 2, the collision-risk determining unit 32c transmits a risk signal indicative of the risk level 2 to the vehicle control unit 16 that then controls the brakes to decelerate the vehicle. If the distance is very short (for example, less than 10 meters), the collision-risk determining unit 32c determines that the risk of collision is high (level 3). If the risk level is 3, the collision-risk determining unit 32c transmits a risk signal indicative of the risk level 3 to the vehicle control unit 16 that then controls steering of the vehicle to avoid collision between the vehicle and the pedestrian.

The contents of the collision-risk determination table 31c described above is merely an example. Alternatively, for example, when a potential object is not pedestrian, a risk level can be provided, and a risk signal can be output to control driving or warning operation appropriate to the risk level. Furthermore, the risk of collision can be calculated by taking into account the speed of the vehicle in addition to the distance between the vehicle and the potential. For example, when the running speed of the vehicle is fast, a distance corresponding to a certain risk level is set longer than when the running speed is slow.

Figure 4:
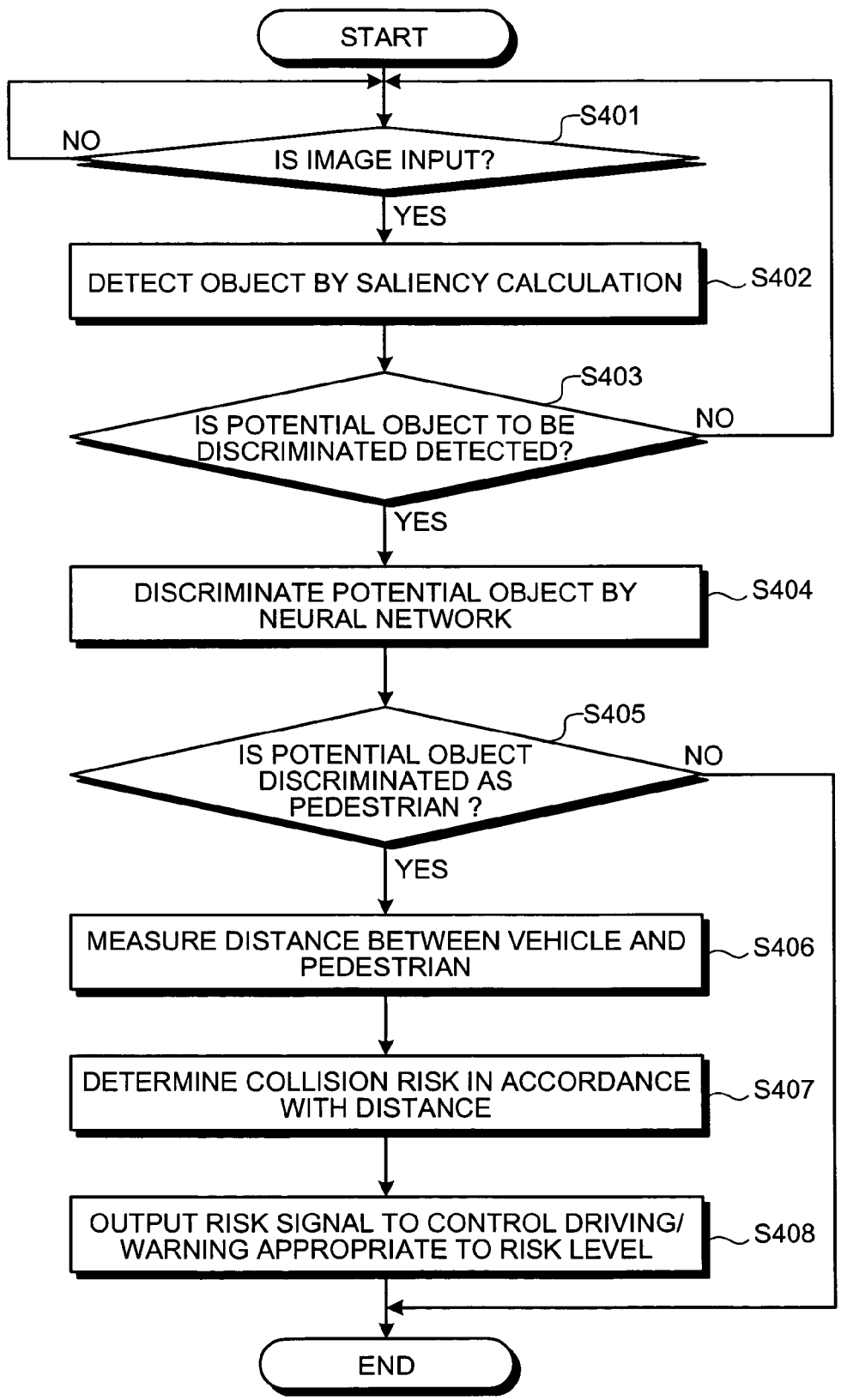
FIG. 4 is a flowchart of processing performed by the object discriminating apparatus shown in FIG. 1.

FIG. 4 is a flowchart of the processing performed by the object discriminating apparatus according to the first embodiment.

As shown in FIG. 4, when receiving an input image (step S401), the object detecting unit 32a detects an object by the saliency calculation (step S402). When a potential object to be discriminated is detected within the input image (Yes at step S403), the object discriminating unit 32b then discriminates the potential object by using the neural network (step S404). If the potential object is discriminated as a pedestrian (Yes at step S405), the collision-risk determining unit 32c measures a distance between the vehicle and the pedestrian (step S406). Precisely, the collision-risk determining unit 32c transmits an instruction to the radar unit 12 to cause the radar unit 12 to measure the distance between the vehicle and the pedestrian.

After receiving the distance from the radar unit 12, the collision-risk determining unit 32c determines a risk of collision in accordance with the distance (step S407). Precisely, in accordance with the collision-risk determination table 31c, for example, if the distance is long (for example, 30 meters or more), the collision-risk determining unit 32c determines that the risk of collision is low (level 1). If the distance is intermediate (for example, between 10 meters and 30 meters), the collision-risk determining unit 32c determines that the risk of collision is intermediate (level 2). If the distance is very short (for example, less than 10 meters), the collision-risk determining unit 32c determines that the risk of collision is high (level 3).

The collision-risk determining unit 32c outputs a risk signal to control driving or warning operation to the warning control unit 15 or the vehicle control unit 16 in accordance with a determined risk level (step S408). Precisely, when the risk of collision is low (level 1), the collision-risk determining unit 32c transmits a risk signal to output an image indicating the pedestrian on to a monitor (for example, a monitor of a car navigation system) to the warning control unit 15, and then in response to the risk signal, the warning control unit 15 outputs the image via the notifying unit 14. If the risk of collision is intermediate (level 2), the collision-risk determining unit 32c transmits a risk signal to control brakes to decelerate the vehicle to the vehicle control unit 16, and then in response to the risk signal, the vehicle control unit 16 decelerates the vehicle. If the risk of collision is high (level 3), the collision-risk determining unit 32c transmits a risk signal to control steering to avoid a collision to the vehicle control unit 16, and then in response to the risk signal, the vehicle control unit 16 leads the vehicle into a motion for collision avoidance.

Turning back to step S403, when no potential object to be discriminated is detected within the input image (No at step S403), the object detecting unit 32a waits to receive a next image. Turning back to step S405, when the potential object is not discriminated as a pedestrian (No at step S405), the collision-risk determining unit 32c does not determine a risk of collision and the object discriminating apparatus 30 ends processing.

According to the first embodiment, the object discriminating apparatus 30 detects an object to be discriminated by applying the saliency calculation to the image shot by the monocular camera, and discriminates the object by applying the neural network method to a detected object. Consequently, the object discriminating apparatus 30 can detect an object (for example, a pedestrian) from the image shot by the monocular camera, moreover, can detect even a stationary object, and furthermore, can detect an object that is far from the vehicle. Thus, because the object discriminating method based on the neural network is applied to the detected object in this way, the object can be more efficiently discriminated on the image shot by the monocular camera. A pattern matching method, by which a detected object is compared with regular patterns recorded in advance to discriminate the detected object, can discriminate only an object that corresponds to one of the regular patterns. However, the object discrimination based on the neural network can discriminate a detected object having a fuzzy contour (for example, a pedestrian) that is not included in the regular patterns.

Moreover, because the object discriminating apparatus 30 controls warning and driving operations in accordance with the discrimination result obtained by applying the neural network method to the object detected as a discrimination target by applying the saliency calculation, the object discriminating apparatus 30 can efficiently control warning and driving operations based on an efficient object discrimination result.

Furthermore, because the object discriminating apparatus 30 controls warning and driving operations based on the distance between the vehicle and the object acquired by an irradiating unit (for example, a millimeter wave radar, or an optical radar) in addition to the object discrimination result obtained from the image, using an accurate distance, the object discriminating apparatus 30 can control warning and driving operations, for example, as the distance getting closer, at first with a warning by image, next a warning by sound or voice, then deceleration by braking control, and at last collision avoidance by steering control. This allows the object discriminating apparatus 30 to control warning and driving operations appropriately in accordance with the distance.

The first embodiment can be modified in different ways. Therefore, other examples according to a second embodiment are explained below.

An example 1 of driving control and warning control by additionally using a distance between the vehicle and an object obtained from an image is explained below. In the first embodiment, the case where vehicle controls including driving control are carried out in accordance with an object discrimination result acquired by the object discriminating unit 32b and a distance between the vehicle and the object (for example, a pedestrian) acquired by the radar unit 12 is explained, however, the present invention is not limited to this. In addition to the object discrimination result acquired by the object discriminating unit 32b and the distance acquired by the radar unit 12, the vehicle controls including driving control can be carried out based on a distance between the vehicle and the object (for example, between the vehicle and feet of the pedestrian (ground contact point)) obtained from the image.

Figure 5:
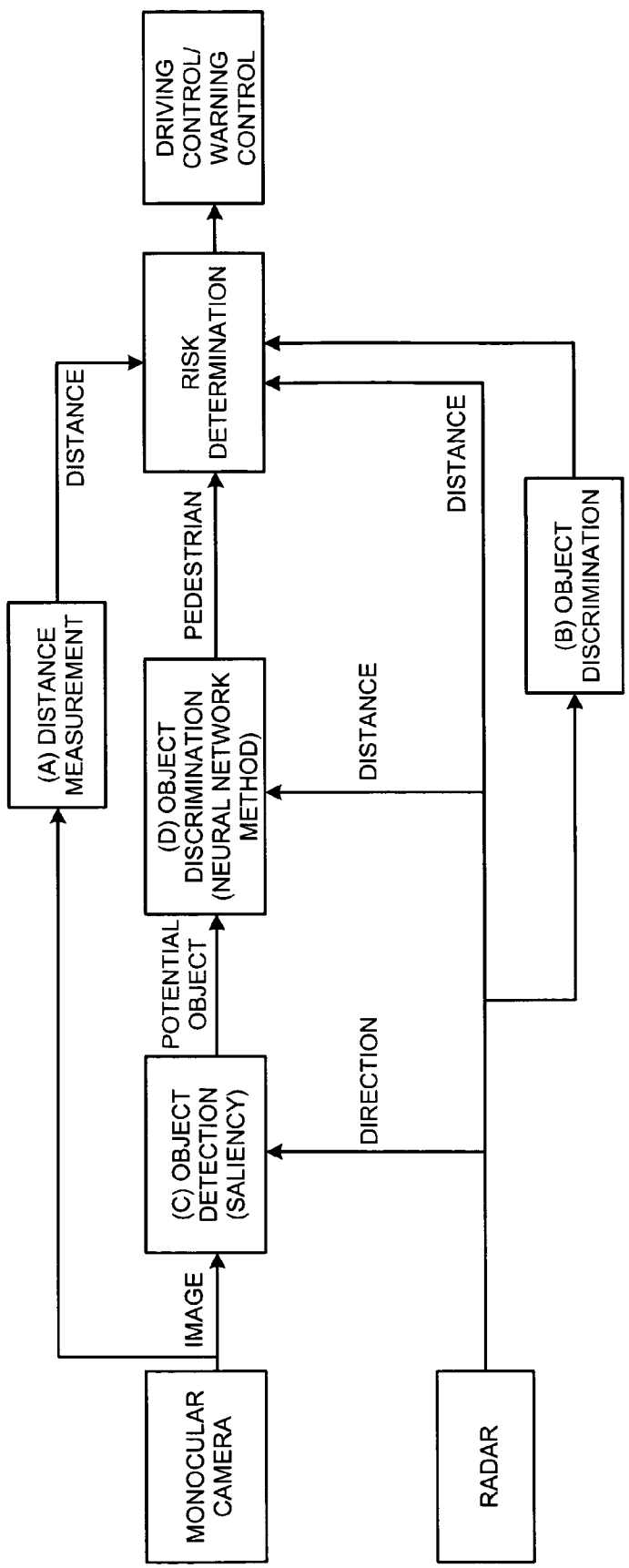
FIG. 5 is a schematic for explaining an outline of an object discriminating apparatus according to a second embodiment of the present invention.

Specifically, shown at block (A) in FIG. 5, in addition to the object discrimination result acquired by the object discriminating unit 32b and the distance acquired by the radar unit 12, using the distance between the vehicle and the object obtained from the image (for example, a distance calculated from pixels between the vehicle and the feet of the pedestrian within the image), the collision-risk determining unit 32c determines a risk of collision, and outputs a risk signal of an instruction of vehicle controls including driving control appropriate to the risk of collision. The vehicle controls are then carried out in response to the risk signal.

Thus, warning and driving operations are controlled in accordance with the distance between the vehicle and the object (for example, between the vehicle and the feet of the pedestrian (ground contact point)) obtained from the image, in addition to an object discrimination result obtained from the image, and the distance between the vehicle and the object acquired by an irradiating unit (for example, a millimeter wave radar, or an optical radar). Accordingly, for example, an averaged distance calculated from the distance acquired by the irradiating unit and the distance obtained from the image can be used for warning control and driving control, thereby enabling warning control and driving control based on a more accurate distance between the vehicle and the object.

An example 2 of driving control and warning control by additionally using another object discrimination result is explained below. In the first embodiment, the case where the vehicle controls including driving control are carried out based on the object discrimination result acquired by the object discriminating unit 32b is explained, however, the present invention is not limited to this. The vehicle controls including driving control can be carried out also based on the object discrimination result acquired by the radar unit 12.

Precisely, as shown in block (B) in FIG. 5, the collision-risk determining unit 32c determines a risk of collision by using the object discrimination result acquired by the radar unit 12 in addition to the object discrimination result acquired by the object discriminating unit 32b and the distance between the vehicle and the object acquired by the radar unit 12. The collision-risk determining unit 32c outputs an instruction for vehicle controls including driving control in accordance with a determined result of the risk of collision: for example, only when the both object discrimination results are the same, the object discrimination result is employed to control warning and driving operations; when any one of the object discrimination results is obtained, the object discrimination result is employed to control warning and driving operations; or an average or a weighted average of the both object discrimination results (discrimination values) is derived to lead to one object discrimination result and to control warning and driving operations.

Thus, warning and driving operations are controlled based on the object discrimination result acquired by the irradiating unit (for example, a millimeter wave radar, or an optical radar) in addition to the object discrimination result obtained from the image. This can prevent false object discrimination and controls warning and driving operations more precisely.

An example 3 of object detection by specifying a direction in which an object is present is explained below. In the first embodiment, the case where the saliency calculation is applied directly to the input image to detect an object to be discriminated is explained, however, the present invention is not limited to this. By detecting a direction in which the object is present when viewing from the vehicle, the saliency calculation can be applied preferentially to an area corresponding to the direction on the image to detect the object to be discriminated. Precisely, as shown block (C) in FIG. 5, the radar unit 12 detects the direction in which the object is present when viewing from the vehicle. The object detecting unit 32a applies the saliency calculation to the area corresponding to the direction on the image to detect the object.

Thus, a direction in which the object is present when viewing from the vehicle is detected, for example, by the irradiating unit (for example, a millimeter wave radar, or an optical radar), and the object to be discriminated is detected by applying the saliency calculation preferentially to an area corresponding to the direction on the image. Consequently, the object to be discriminated can be detected more rapidly and efficiently than when the saliency calculation is applied to the whole area within the image (for example, when the saliency calculation is applied from an upper left area of the image to a lower right area in order).

An example 4 of object discrimination in accordance with a distance is explained below. In the first embodiment, the case where the neural network method is equally applied to the object detected as a target to be discriminated is explained, however, the present invention is not limited to this. By measuring a distance between the vehicle and the object, the neural network method can be applied in accordance with the distance to discriminate the object. Precisely, as shown at block (D) in FIG. 5, the radar unit 12 measures the distance between the vehicle and the object. When applying the neural network method, the object discriminating unit 32*b* uses patterns appropriate to the distance to discriminate the object.

Thus, a distance between the vehicle and the object is measured, for example, by the irradiating unit (for example, a millimeter wave radar, or an optical radar), and the neural network method is applied in accordance with the distance to discriminate the object. Consequently, the object can be discriminated more rapidly and efficiently than when the neural network method is applied to the object in accordance with all distances (for example, when the neural network method is applied with patterns from a near distance to a far distance in order).

An example 5 of detecting other than a pedestrian is explained below. In the first embodiment, the case where a pedestrian is detected as an object to be discriminated is explained, however, the present invention is not limited to this. Other objects than a pedestrian (a potential obstacle against driving operation, such as a fallen tree) can be detected. In consequence, an efficient driving control can be applied to various objects each of which can be a potential obstacle.

Apparatus configuration, a computer program, and other relevant aspects of the embodiment are explained below. Some of the processing processes in the embodiments explained above are explained as to be performed automatically, however, the whole or part of such processing can be performed manually. Conversely, the whole or part of the processing explained as to be performed manually can be performed automatically by a known method. Processing procedures, control procedures, specific names, and information including various data and parameters described in the description and the drawings can be changed arbitrarily, unless otherwise specified.

Each element of the object discriminating apparatus 30 shown in FIG. 2 presents a functional concept, so that an actual apparatus does not need to have configuration physically similar to the drawing. Precisely, a specific form of separation and integration of each unit is not limited to the one shown in FIG. 2. The object detecting unit 32*a*, the object discriminating unit 32*b*, and the collision-risk determining unit 32*c* can be configured by separating or integrating the whole or part of the units physically or functionally by any unit, depending on a load or an operational situation. For example, the object detecting unit 32*a* and the object discriminating unit 32*b* can be integrated, or the object detecting unit 32*a*, the object discriminating unit 32*b*, and the collision-risk determining unit 32*c* can be integrated. Furthermore, the whole or any part of functions of the processing performed by the object discriminating apparatus 30 can be achieved by a central processing unit (CPU) or a computer program executed by the CPU, or hardware according to a wired-logic.

The method of detecting an object, discriminating an object, and vehicle controls explained in the first embodiment (see FIG. 4), can be achieved by causing a computer, such as a personal computer or a workstation, to execute a computer program provided in advance. The computer program can be delivered via a network such as the Internet. The computer program can also be recorded on a recording media readable by computer, such as a hard disk, a flexible disk (FD), a compact disc read only memory (CD-ROM), a magneto-optical disk (MO), a digital versatile disk (DVD) and the like, and read out from the recording media by a computer to be executed.

The collision-risk determining unit 32*c* in the first embodiment can also output only a determination result of a risk of collision as a signal to the warning control unit 15 or the vehicle control unit 16, and allow the warning control unit 15 or the vehicle control unit 16 to decide how to control warning or driving operation based on the signal.

According to the embodiments of the present invention, the object discriminating apparatus detects an object to be discriminated by applying the saliency calculation to the image shot by the monocular camera, and discriminates the object by applying the neural network method to a detected object. Consequently, the object discriminating apparatus can detect the object to be discriminated (for example, a pedestrian) from the image shot by the monocular camera, moreover, the object discriminating apparatus can detect the object as a target to be discriminated even when the object is stationary, and furthermore, the object discriminating apparatus can detect the object as a target to be discriminated even when an observed change on the image is little because the object is situated far from the vehicle. Thus, because the object discriminating method based on the neural network is applied to the detected object in this way, the object can be more efficiently discriminated on the image shot by the monocular camera than when the object discriminating method based on the neural network is applied directly to the image shot by the monocular camera as a whole without detecting target to be discriminated. A pattern matching method, by which a detected object is compared with regular patterns recorded in advance to discriminate the detected object, can discriminate only an object that corresponds to one of the regular patterns. However, the object discrimination based on the neural network can discriminate a detected object having a fuzzy contour (for example, a pedestrian) that is not included in the regular patterns.

Moreover, because warning and driving operations are controlled in accordance with the discrimination result obtained by applying the neural network method to the object detected as a discrimination target by applying the saliency calculation, warning and driving operations can be controlled efficiently based on an efficient object discrimination result.

Furthermore, warning and driving operations are controlled based on the distance between the vehicle and the object acquired by the irradiating unit (for example, a millimeter wave radar, or an optical radar), in addition to the object discrimination result obtained from the image. Using an accurate distance, warning and driving operations are controlled, for example, as the distance getting closer, at first with a warning by image, next a warning by sound or voice, then deceleration by braking control, and at last collision avoidance by steering control. Consequently, warning and driving operations are appropriately controlled in accordance with the distance.

Moreover, warning and driving operations are controlled based on the distance between the vehicle and the object obtained from the image, in addition to the object discrimination result obtained from the image, and the distance between the vehicle and the object acquired by the irradiating unit. Accordingly, for example, an averaged distance calculated from the distance acquired by the irradiating unit and the distance obtained from the image can be used for warning control and driving control. This enables warning control and driving control based on a more accurate distance between the vehicle and the object.

Furthermore, warning and driving operations are controlled based on the object discrimination result acquired by the irradiating unit, in addition to the object discrimination result obtained from the image. For example, the following options are available: only when the both object discrimination results are the same, the object discrimination result is employed to control warning and driving operations; when any one of the object discrimination results is obtained, the object discrimination result is employed to control warning and driving operations; or an average or a weighted average of the both object discrimination results (discrimination values) is derived to lead to one object discrimination result to control warning and driving operations. This can prevent false object discrimination and controls warning and driving operations more precisely.

Moreover, a direction in which the object is present when viewing from the vehicle is detected by the irradiating unit, and the object to be discriminated is detected by applying the saliency calculation preferentially to an area corresponding to the direction on the image. Consequently, the object to be discriminated can be detected more rapidly and efficiently than when the saliency calculation is applied to the whole area within the image (for example, when the saliency calculation is applied from an upper left area of the image to a lower right area in order).

Furthermore, a distance between the vehicle and the object is measured by the irradiating unit, and the neural network method is applied in accordance with the distance to discriminate the object. Consequently, the object can be discriminated more rapidly and efficiently than when the neural network method is applied to the object in accordance with all distances (for example, when the neural network method is applied with patterns from a near distance to a far distance in order).

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An apparatus for discriminating an imaged object within an image based on the image shot by a monocular camera, the apparatus comprising:
    an object detecting unit that detects an object in the image by applying a saliency calculation to the image; and
    an object discriminating unit that applies a neural network method to the object detected by the object detecting unit to discriminate whether the object is a potential obstacle, wherein
    the object detecting unit detects the object as a salient feature that is not found in a learning base commonly extracted from a plurality of background images without the object.

2. The apparatus according to claim 1, wherein the monocular camera and the apparatus are installed on a vehicle, and the apparatus further comprises a risk determining unit that determines a risk of collision of the vehicle with the potential obstacle, and outputs a risk signal indicative of the risk.

3. The apparatus according to claim 2, further comprising a distance acquiring unit that acquires a first distance between the vehicle and the potential obstacle, wherein
    the risk determining unit determines the risk based on the first distance.

4. The apparatus according to claim 3, wherein the distance acquiring unit includes an irradiating unit that irradiates waves toward the potential obstacle, detects reflected waves from the potential obstacle, and calculates the first distance based on traveling speed of the waves and time difference between irradiation of the waves and detection of the reflected waves.

5. The apparatus according to claim 3, wherein the risk determining unit further comprises a distance calculating unit that calculates a second distance between the vehicle and the potential obstacle from the image, and the risk determining unit determines the risk based on the first distance and the second distance.

6. The apparatus according to claim 2, further comprising an irradiating unit that is installed on a vehicle, and discriminates whether an object in a running path of the vehicle is a potential obstacle by irradiating waves toward the object and detecting reflected waves from the object, wherein
    the risk determining unit determines the risk based on discrimination results by the irradiating unit and the object discriminating unit.

7. The apparatus according to claim 1, further comprising an irradiating unit that is installed on a vehicle, and acquires a direction of an object in a running path of the vehicle by irradiating waves toward the object and detecting reflected waves from the object, wherein
    the object detecting unit detects the object by applying the saliency calculation to an area on the image corresponding to the direction.

8. The apparatus according to claim 1, further comprising a distance acquiring unit that is installed on a vehicle, and acquires a distance between the vehicle and an object in a running path of the vehicle, wherein
    the object discriminating unit applies the neural network method in accordance with the distance.

9. An apparatus for discriminating an imaged object within an image based on the image shot by a monocular camera, the apparatus comprising:
    a learning base storing unit that creates and stores a learning base commonly extracted from a plurality of background images without the image object;
    a discriminating-pattern storing unit that learns and stores specific patterns of an object in advance;
    an object detecting unit that compares the learning base and an actual input background image, and detects a residual based on the learning base and the actual input background image as a potential object; and
    an object discriminating unit that compares the potential object with the specific patterns present in the discriminating-pattern storing unit, and discriminates whether the potential object is a specific object, wherein the object detecting unit detects the object as a salient feature that is not found in a learning base commonly extracted from a plurality of background images without the object.

10. A warning apparatus operating with an object discriminating device for discriminating an imaged object within an image based on shot image, the warning apparatus comprising:
a warning unit that outputs a warning in accordance with a discrimination result obtained by the object discriminating device,
wherein the object discriminating device includes a learning base storing unit that creates and stores therein a learning base commonly extracted from a plurality of background images without the image object, a discriminating-pattern storing unit that learns and stores therein specific patterns of an object in advance, an object detecting unit that compares the learning base and an actual input background image, and detects a residual based on the learning base and the actual input background image as a potential object, and an object discriminating unit that compares the potential object with the specific patterns present in the discriminating-pattern storing unit, and discriminates whether the potential object is a specific object.

11. A vehicle-controlling apparatus installed on a vehicle and operating with an object discriminating device for discriminating an imaged object within an image based on shot image, the vehicle-controlling apparatus comprising:
a controlling unit that controls driving of the vehicle in accordance with a discrimination result obtained by the object discriminating device,
wherein the object discriminating device includes a learning base storing unit that creates and stores a learning base commonly extracted from a plurality of background images without the image object, a discriminating-pattern storing unit that learns and stores specific patterns of an object in advance, an object detecting unit that compares the learning base and an actual input background image, and detects a residual based on the learning base and the actual input background image as a potential object, and an object discriminating unit that compares the potential object with the specific patterns present in the discriminating-pattern storing unit, and discriminates whether the potential object is a specific object and the object detecting unit detects the object as a salient feature that is not found in a learning base commonly extracted from a plurality of background images without the object.

12. A method of discriminating an imaged object within an image based on the image shot by a monocular camera, the method comprising:
detecting an object in the image by applying a saliency calculation to the image, with a processor; and
applying a neural network method in the processor to the to detected object to discriminate whether the object is a potential obstacle, wherein
the detecting includes detecting the object as a salient feature that is not found in a learning base commonly extracted from a plurality of background images without the object.

13. A method of discriminating an imaged object within an image shot by a monocular camera, the method comprising:
creating and storing in a memory device a learning base commonly extracted from a plurality of background images without the image object;
learning and storing specific patterns of an object in advance;
comparing the learning base and an actual input background image with a processor;
detecting in the processor a residual based on the learning base and the actual input background image as a potential object; and
discriminating whether the potential object is a specific object by comparing the potential object with the specific patterns stored in advance at the storing, wherein the detecting includes detecting the object as a salient feature that is not found in a learning base commonly extracted from a plurality of background images without the object.

14. A non-transitory computer-readable recording medium that stores therein a computer program that causes a computer to execute a method of discriminating an object within an image based on the image shot by a monocular camera, the computer program causing the computer to execute:
detecting an object in the image by applying a saliency calculation to the image; and
applying a neural network method to detected object to discriminate whether the object is a potential obstacle, wherein
the detecting includes detecting the object as a salient feature that is not found in a learning base commonly extracted from a plurality of background images without the object.

15. A computer program stored on a non-transitory computer-readable recording medium that stores therein a computer program that causes a computer to execute a method of discriminating an object within an image shot by a monocular camera, the computer program causing the computer to execute:
creating and storing a learning base commonly extracted from a plurality of background images without the image object;
learning and storing specific patterns of an object in advance;
comparing the learning base and an actual input background image;
detecting a residual based on the learning base and the actual input background image as a potential object; and
discriminating whether the potential object is a specific object by comparing the potential object with the specific patterns stored in advance at the storing, wherein the detecting includes detecting the object as a salient feature that is not found in a learning base commonly extracted from a plurality of background images without the object.

* * * * *